US012773001B2

(12) United States Patent
Randel

(10) Patent No.: US 12,773,001 B2
(45) Date of Patent: Oct. 27, 2026

(54) MUSHROOM COMPOUNDS INFUSED CONSUMABLES AND NON-CONSUMABLES

(71) Applicant: TLCO Holdings Inc., Playa Del Rey, CA (US)

(72) Inventor: Michael William Randel, Lakebay, WA (US)

(73) Assignee: TLCO HOLDINGS INC., Playa del Rey (CA)

( * ) Notice: Subject to any disclaimer, the term of this patent is extended or adjusted under 35 U.S.C. 154(b) by 399 days.

(21) Appl. No.: 17/949,126

(22) Filed: Sep. 20, 2022

(65) Prior Publication Data

US 2024/0090554 A1 Mar. 21, 2024

Related U.S. Application Data

(60) Provisional application No. 63/246,232, filed on Sep. 20, 2021.

(51) Int. Cl.
*A23L 31/00* (2016.01)
*A23D 9/007* (2006.01)
*A23F 5/00* (2025.01)

(52) U.S. Cl.
CPC .............. *A23L 31/00* (2016.08); *A23D 9/007* (2013.01); *A23F 5/00* (2013.01); *A23V 2300/14* (2013.01); *A23V 2300/20* (2013.01); *A23V 2300/24* (2013.01); *A23V 2300/38* (2013.01)

(58) Field of Classification Search
CPC ........... A23L 31/00; A23D 9/007; A23F 5/00; A23V 2300/14; A23V 2300/20; A23V 2300/24; A23V 2300/38
See application file for complete search history.

(56) References Cited

U.S. PATENT DOCUMENTS

2015/0030743 A1 1/2015 Anders

FOREIGN PATENT DOCUMENTS

| | | | |
|---|---|---|---|
| CN | 107136228 | A | 9/2017 |
| WO | 2022072456 | A1 | 4/2022 |
| WO | 2023049472 | A1 | 3/2023 |

OTHER PUBLICATIONS

"Olive oil infusion recipe: A Cook's Secret Weapon". Available online at https://winecountrytable.com on Jul. 20, 2017. (Year: 2017).*

Xiao et al., "Aroma improvement by repeated freeze-thaw treatment during Tuber melanosporum fermentation". Available online at www.nature.com/scientificreports/srep17120 on Nov. 26, 2015. (Year: 2015).*

(Continued)

*Primary Examiner* — Erik Kashnikow
*Assistant Examiner* — Assaf Zilbering
(74) *Attorney, Agent, or Firm* — CALDWELL LLC

(57) ABSTRACT

The present disclosure is directed to mushroom compounds infused food and beverage consumables and non-consumables, along with methods of producing the mushroom compounds infused consumables and non-consumables. The consumables are infused in an overall two-step process, in which mushroom compounds from a mushroom species are first infused into a food grade oil, which in turn is used to infuse food and beverage consumables. Mushroom compounds infused oil may also be used in formulations of non-consumables.

20 Claims, 3 Drawing Sheets

(56) References Cited

OTHER PUBLICATIONS

"TIL that you can rerum your oil infusion after freezing". Available online at https://www.reddit.com/r/SousWeed/comments/lkhayu/til_that_you_can_rerun_your_oil_infusion_after/?rdt=54868&force_seo=1 (Year: 2020).*
"Coffee infused Oil". available online at https://happyacres.blog on Mar. 15, 2013 (Year: 2013).*
Cotter, "3 Ways to Use MCT Oll". Available online at https://www.cottercrunch.com/3-ways-to-use-mct-oil/ on Feb. 5, 2018 (Year: 2018).*
"Can you cook magic mushrooms—Georgia Straight". Available online at https://www/straight.com on Jul. 21, 2020. (Year: 2020).*
Anonymous: "Lobster Infused Cooking Oil—Jeanie and Lulu's Kitchen", May 3, 2017 (May 3, 2017), pp. 1-4, XP093231509, Retrieved from the Internet: URL:https://jeanieandluluskitchen.com/lobs ter-infused-cooking-oil/.
Caroline : "Magic mushrooms: Mushrooms in Olive Oil—Bibliocook—All About Food", Jun. 17, 2006 (Jun. 17, 2006), pp. 1-9, XP093231513, Retrieved from the Internet: URL:https://bibliocook.com/2006/06/magic-mushrooms/.
Anonymous: "Carma Butter: A Step-by-Step Recipe for the Most Effective Cannabis Oil—The Dude Grows Show", Aug. 12, 2016 (Aug. 12, 2016), XP093231495, Retrieved from the Internet: URL:https://dudegrows.com/make-potent-cann abis-oil-aka-canna-butter/ * pp. 1-3 *.
Mj Staff: "Can You Really Infuse Psilocybin into Coffee and Teas?—Merry Jane", Oct. 2, 2019 (Oct. 2, 2019), XP093231187, Retrieved from the Internet: URL:https://merryjane.com/culture/can-yo ••really-infuse-psilocybin-into-coffee-and-teas/.
Danny Walsh: "How Do We Infuse Our Coffee Beans?—Peak State Coffee", Jul. 14, 2021 (Jul. 14, 2021).
9news: "Denver roaster considers adding magic mushrooms to coffee", Aug. 9, 2019 (Aug. 9, 2019), XP093231170, Retrieved from the Internet: URL:https://www.youtube.com/watch?v=Wnp88m ovwYM.
Supplementary European Search Report; EP22870862; Date: Dec. 5, 2024.

* cited by examiner

MUSHROOM COMPOUNDS INFUSED CONSUMABLES AND NON-CONSUMABLES

CROSS-REFERENCE TO RELATED APPLICATION

This application claims the benefit of U.S. Provisional Application No. 63/246,232 filed on Sep. 20, 2021, which is incorporated by reference in its entirety.

FIELD OF THE INVENTION

The invention relates to mushroom compounds that are infused into food grade oil, which in turn is used to infuse a variety of food and beverage consumables as well as non-consumables.

BACKGROUND

Mushrooms are commonly consumed for their taste and flavor as well as for compounds they contain. A wide variety of mushrooms are consumed directly or as flavoring for other foods. In addition, there are mushrooms consumed for health effects and psychoactive effects. For example, Lion's Mane mushrooms are valued for their health benefits.

A class of mushrooms collectively known as psilocybin mushrooms and commonly referred to as magic mushrooms are widely consumed for their psychoactive and psychedelic effects. These mushrooms contain psilocybin, a naturally occurring psychedelic compound that is converted in the liver into psilocin, which produces a psychoactive effect. The composition of psilocybin mushrooms varies from one species to another, with varying amounts of psilocybin as well as other compounds including psilocin, norpsilocin, baeocystin, norbaeocystin, and aeruginascin. These other compounds may modify the effects of psilocybin mushrooms in a manner that makes the combination of compounds preferable to consumption of just psilocybin.

There are many methods of consuming psilocybin mushrooms to obtain a desired psychoactive effect(s). Psilocybin mushrooms are commonly eaten, either as fresh or dried mushrooms, which has the significant drawbacks of a poor, bitter taste, requirement of significant chewing of the mushrooms, and often, queasiness from consumption. Another common form of consumption is to make and drink a mushroom tea, which again can have an unpleasant taste. Yet another common form of consumption is to grind mushrooms and add mushroom powder to a variety of foods, which can be messy, coupled with an unpleasant taste. Other forms of consumption include mushroom chocolate and a technique called lemon tek, where psilocybin mushrooms are soaked in lemon juice or some other kind of acidic liquid.

Given the drawbacks of commonly used methods of psilocybin mushroom consumption, there exists a need in the art for food and beverage consumables that contain mushroom compounds and deliver their desired health and psychoactive effects. In addition, there is a need for consumables that contain desired mushroom flavoring without mushrooms themselves. Furthermore, there is a need for consumables that contain desired mushroom compounds from a wide spectrum and variety of different types of mushrooms. The presently disclosed mushroom compounds-containing food grade oil and food and beverage consumables, along with methods of preparing such consumables address these needs. In addition, the presently disclosed methods can be used in the preparation of non-consumable products.

SUMMARY

The present disclosure provides for orally ingestible, mushroom compounds infused food and beverage consumables and methods of producing such consumables.

The overall method disclosed entails a two-step process in which coconut oil or another food grade oil is first infused with whole spectrum mushroom compounds from a species of mushroom. In the second step, the mushroom compounds infused coconut oil or other oil is used to infuse a given consumable, to generate a whole spectrum mushroom compounds infused food consumable. A mushroom compounds infused food consumable, such as coffee beans, can be used to generate a mushroom compounds infused beverage, such as coffee.

In a preferred embodiment, a food grade oil is infused with whole spectrum mushroom compounds. The infusion method includes providing mushroom material/biomass; heating the mushroom material with a food grade oil at a temperature of 180° F.-240° F. for 4-9 hours; freezing the mushroom and food grade oil mixture into a solid frozen biomass; heating the solid, frozen biomass of mushroom material and food grade oil at temperature of 150° F.-200° F. for 2-4 hours to liquefy the food grade oil, and straining the mushroom material and food grade oil mixture to separate the food grade oil from the mushroom material to yield food grade oil infused with whole spectrum mushroom compounds.

Once a whole spectrum mushroom compounds infused food grade oil is obtained, the infused food grade oil can in turn be used to infuse consumables with a whole spectrum mushroom compounds. In a preferred embodiment, an orally ingestible consumable is mixed with whole spectrum mushroom compounds infused food grade oil and heated to a temperature of 170° F.-240° F. for 4-9 hours; the consumable and infused food grade oil mixture is then frozen to form a solid, frozen mixture; the mixture is then heated to a temperature of 150° F.-200° F. for 2-4 hours to liquefy the infused oil; and the consumable is then strained from the infused oil to yield a consumable infused with whole spectrum mushroom compounds. Preferably, the infused consumable is next frozen prior to subsequent use of the consumable.

The presently disclosed methods can be employed with virtually any type of mushroom. Such mushrooms include chanterelle, truffle, morel, trumpet, oyster, shiitake, maitake, cremini, lobster, porcini, hedgehog, portobello, white, button, eenoki, cordyceps, lion's mane, reishi, argarikon, cordyceps, chaga, maitake, turkey tail, shiitake, psilocybin, and combinations thereof. In one preferred embodiment, a psilocybin mushroom is used to generate food grade oil and consumables infused with psilocybin and other psilocybin mushroom compounds. In another embodiment, the method preferably is used with lion's mane mushrooms.

In another preferred embodiment, a method of infusing oil for use in non-consumable products is disclosed.

The presently disclosed mushroom compounds infused consumables and non-consumables are more fully described in the detailed description below.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

Mushrooms are commonly consumed for their flavors, health benefits, and psychoactive effects. The flavors, health benefits, and psychoactive effects of mushrooms can be attributed to one or more compounds found in mushrooms. The presently disclosed mushroom compounds infused consumables and methods of producing such consumables provide for a wide range of food and beverage consumables that impart desired qualities and effects as a result of infused mushroom compounds in the consumables.

In general, the presently disclosed mushroom compounds infused consumables relate to a wide variety of foods and, in some cases, resultant beverages made from the food/consumable that provide a source of mushroom compounds. The presently disclosed consumables are infused with mushroom compounds in a way that provides significant levels and quantities of desired mushroom compounds transferred to the consumables while reducing or eliminating undesirable tastes, flavors, odors, food texture, and the like typically associated with many types of mushrooms. The mushroom compounds infused into the consumables can impart desired mushroom flavors, health benefits, and psychoactive effects into the consumables.

The mushroom compounds infusion methods described herein can be used to infuse a wide variety of food consumables, which in some instances can in turn be used to make an infused beverage. Virtually any food consumable that can be effectively manipulated in the method(s) described herein can be a candidate for infusion with mushroom compounds. Examples of such foods include, but are not limited to, coffee beans, cacao beans, raw nuts and seeds, roasted nuts and seeds, popcorn kernels, dehydrated fruit, raw fruit, trail mix, granola bars, garlic, beans, bacon, ice cream, jams and jellies, baked goods, caramel sauce, and freeze-dried consumables.

As used herein, the term “infused mushroom compounds” or “mushroom compounds infused” refers to consumables to which whole spectrum compounds from mushrooms have been infused by a method(s) disclosed herein. The infusion method generally involves preparing a mixture made with mushroom materials (whole or parts of mushrooms) and coconut oil (or similar food grade oil) under specific heating and cooling conditions to produce whole spectrum mushroom compounds infused oil. In turn, the mushroom compounds infused oil is used to infuse consumables as detailed herein. Throughout this specification, mushroom compounds infused food and/or drink may be referred to as “mushroom compounds infused” or simply “infused,” such as “mushroom compounds infused cacao beans” or “infused cacao beans.”

Figure 1:
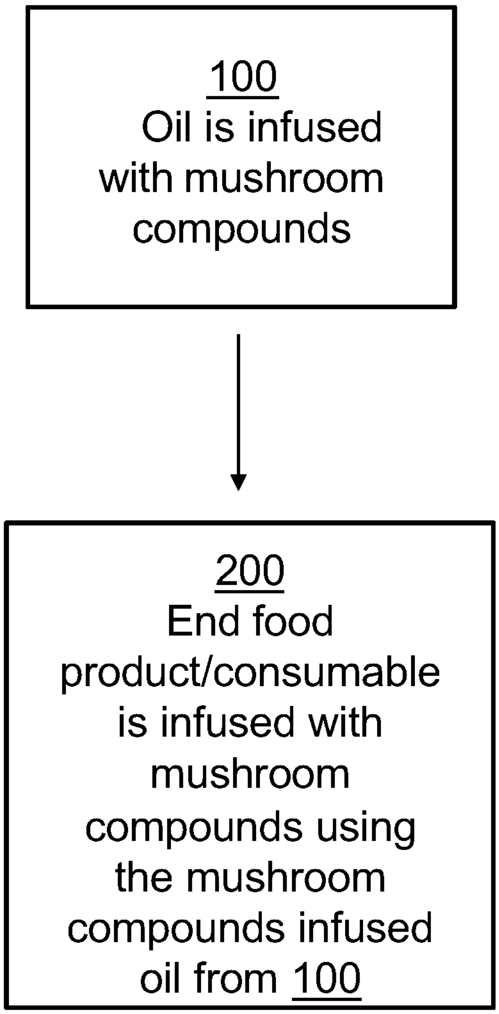
FIG. 1 shows example steps of a method according to exemplary embodiments hereof.

In some embodiments as shown in FIG. 1, mushroom compounds infused foods and/or drinks prepared by the methodology disclosed herein are generated in an overall two-step process. In the first step (at 100), mushroom material (whole mushrooms or parts of mushrooms) is used to infuse a food grade oil, preferably coconut oil, with mushroom compounds. Note that because whole mushroom material (whether whole or parts of mushroom) is used at 100, the resulting infusion of the oil or dairy product or water from the mushroom provides a full spectrum of mushroom compounds from the mushroom to the oil or dairy product or water. In a second step (at 200), the infused food grade oil is used to infuse an end food product/consumable with whole spectrum mushroom compounds. After the end product is infused with mushroom compounds, it may be consumed in any typical fashion, such as direct consumption, used to make a beverage as in the case of coffee beans, and so forth.

Consumption of the mushroom compounds infused food and drink consumables generated by the methods described herein provides desired and/or beneficial effects generally associated with mushrooms. These effects include, but are not limited to, food flavoring, mental and physical effects, psychoactive effects (such as in foods infused with psilocybin containing mushrooms), and other effects attributed to consumption of mushrooms.

Figure 2:
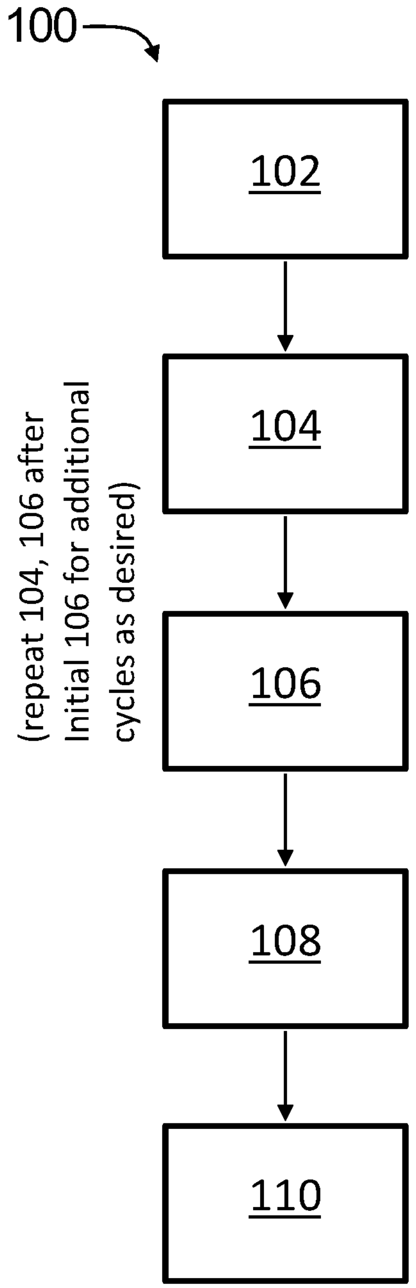
FIG. 2 shows example steps of a method according to exemplary embodiments hereof.

FIG. 2 refers to steps that may be taken to infuse a food grade oil with mushroom compounds to complete step 100 of FIG. 1. Suitable food grade oils for this process include, but are not limited to, coconut oil, medium chain triglycerides (MCT) oil, vegetable oil, sunflower oil, grape seed oil, avocado oil, and combinations thereof. Likewise, shortening, margarine, butter, or lard may be used in the process.

In one embodiment as shown in FIG. 2, whole or parts of mushrooms can be used in the process, depending on the desired infusion effects. Parts of mushrooms may have a higher concentration of a desired, specific compound or compounds, such that the most effective infusion occurs with a part of a mushroom (rather than whole mushrooms). Accordingly, it may be preferable to use just mushroom caps, stalks/stems, mycelium, combinations thereof, and so forth in the presently described method(s). For example, a particular species of psilocybin mushroom might contain higher concentrations of psilocybin in the cap as opposed to the stem, such that it’s advantageous to conduct the infusion with just caps, rather than the whole mushroom.

Virtually any type, variety, or species of mushroom can be used in the presently described method(s). For example, infusion of mushroom flavors can be obtained from any particular mushroom variety typically consumed for its flavor or in cooking, such as, but not limited to Chanterelle, Truffle—Black & White, Morel, Trumpet—King & Black, Oyster, Shiitake, Maitake—Hen of the Woods, Cremini, Lobster, Porcini, Hedgehog, Portobello, Button/White, Enoki, Beech, and combinations thereof. Infusion of compounds that may help reduce the effects of stress on one’s body can be obtained from adaptogenic mushrooms, such as Cordyceps, Lion’s Mane, and Reishi mushrooms. Likewise, exemplary species of mushrooms recognized for exemplary beneficial effects and function can include, but are not limited to, Argarikon (immune response), Cordyceps (energy, stamina, and libido), Chaga (antioxidants, immunity balancer, anti-inflammatory, and energy), Lion’s Mane (cognitive function, concentration, focus, and sleep), Maitake (immunity booster and anti-inflammatory), Reishi (immunity booster, stress and anxiety relief, and sleep), Turkey Tail (immune function and gut), Shiitake (immunity booster, hair, skin and nails), and combinations thereof. In addition, there are well over 100 species of psilocybin mushrooms that contain psilocybin, which is a known psychoactive and psychedelic compound that may have beneficial effects with respect to treating addiction, depression, death anxiety, anorexia, demoralization syndrome, and obsessive-compulsive disorder. Accordingly, infusion of food and beverage with mushroom compounds can provide a wide range of desired properties, benefits, and function, such as flavoring, functional and psychoactive properties for addressing anxiety, depression, addiction, additional mental illnesses, and so forth.

As shown in FIG. 2 (at 102), a suitable food grade oil such coconut oil, MCT oil, another similar oil as described above, a combination of coconut oil and MCT oil, or a combination of two or more similar oils as described above, is heated to a temperature equal to or between about 170° and 240° F. In a preferred embodiment, the temperature is equal to or between about 180° and 220° F. For the purposes of this specification, the term "about" used in relation to temperatures will mean within ±1%. Regarding a combination of coconut oil and MCT oil, a preferred embodiment is to use a ratio of 75% coconut oil to 25% MCT oil. Alternatively, ratios of coconut oil to MCT oil can range from any ratio of coconut oil to MCT oil, such as, but not limited to, 90% coconut oil:10% MCT oil to 10% coconut oil: 90% MCT oil.

Next (at 104), the mushroom material (whole or parts of mushrooms) is added to the food grade oil and held at the temperature between 180° and 240° F. for 4-9 hours, while occasionally (or continuously) stirring the mixture. In some embodiments, the ratio of mushroom material to good grade oil is 1 lb. mushroom material to 2 gallons oil. However, other ratios within 10%, 20%, 30%, 40%, 50%, 75%, 100% of this ratio also may be used. In general, the ratio will be chosen to provide high levels/concentration(s) of mushroom compounds within the oil.

After the heating step of 104, in the next step (at 106), the mushroom material and food grade oil mixture is frozen to obtain a solid, frozen biomass of mushroom material and food grade oil mixture.

At this juncture, the solid, frozen biomass of mushroom material and food grade oil can be processed in one of several ways. First, the frozen biomass can be heated and strained as per steps 108 and 110 (below) to yield mushroom compounds infused food grade oil produced by a single cycle or phase of heating and freezing. Second, the frozen biomass alternatively can be treated with a second cycle or phase of heating and freezing, in which steps 104 and 106 are repeated, followed by subsequent steps 108 and 110 to yield mushroom compounds infused food grade oil produced by two cycles of heating and freezing. Third, the second cycle treatment can be followed by a third cycle or phase of heating and freezing, in which steps 104 and 106 are repeated, followed by subsequent steps 108 and 110 to yield mushroom compounds infused food grade oil produced by three cycles of heating and freezing. Fourth, following a third cycle, the frozen biomass can be treated by a fourth cycle or phase of heating and freezing, in which steps 104 and 106 are repeated, followed by heating the frozen biomass and straining it as per steps 108 and 110 to yield mushroom compounds infused food grade oil produced by four cycles or phases of heating and freezing.

The single cycle/phase treatment typically will produce mushroom compounds infused food grade oil having a lesser relative level of infused mushroom compounds compared to a double cycle/phase treatment that will typically yield a greater level of infused mushroom compounds. For some particular applications, a third and/or fourth cycle treatment may yield an even greater level of infused mushroom compounds than a single or double cycle treatment.

Following step 106, at step 108, the solid, frozen mushroom and food grade oil biomass is reheated to 150° to 200° F. and held at the temperature for a sufficient period of time to liquefy the mixture, typically for about 2-4 hours.

Next (at 110), the mushroom and food grade oil mixture is strained using a press bag (or other suitable straining techniques) to separate the mushroom compounds infused food grade oil from the mushroom biomass.

This method results in a whole spectrum mushroom compounds infused food grade oil that may be used for infusing food consumables, as described below.

Figure 3:
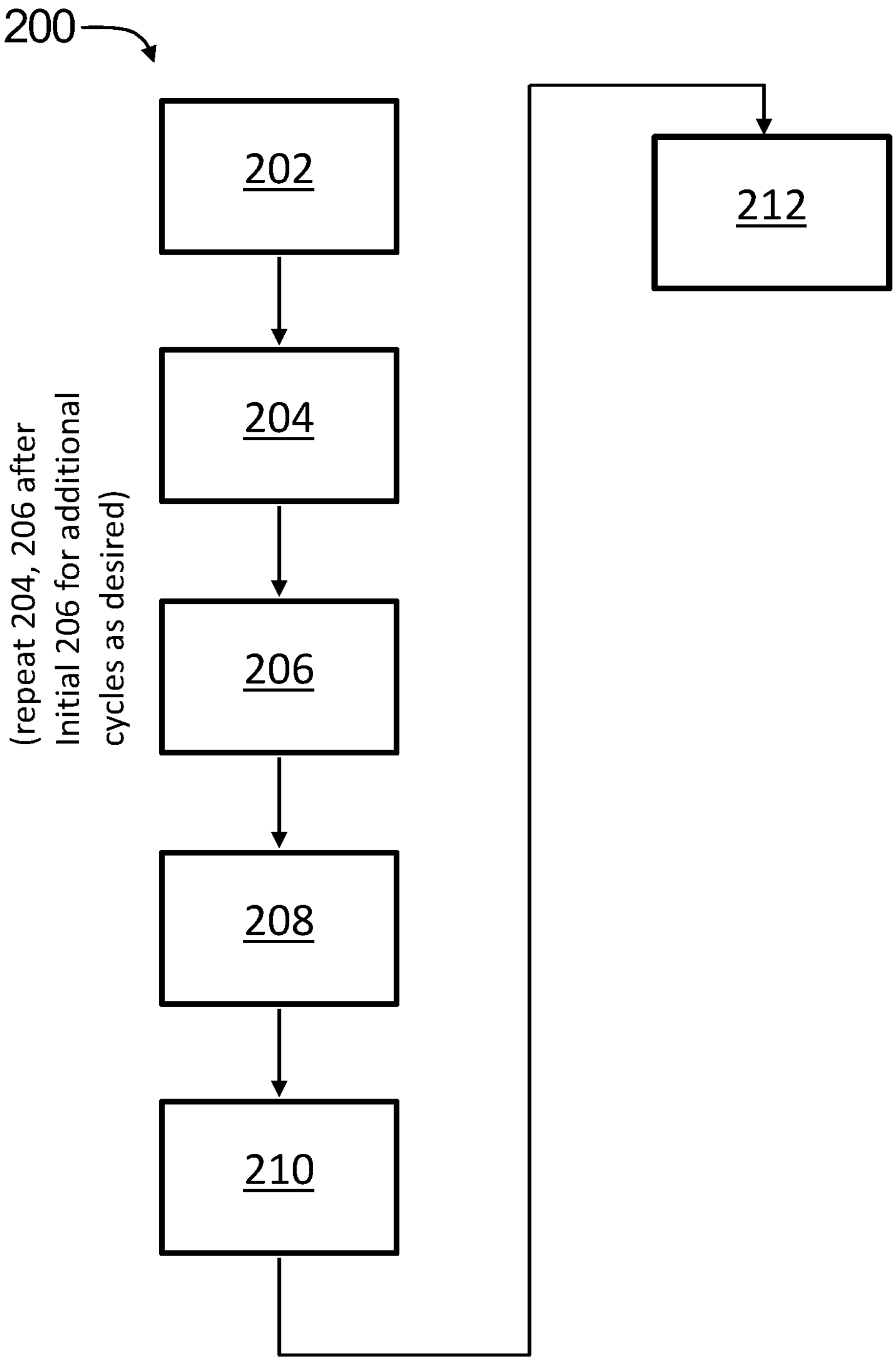
FIG. 3 shows example steps of a method according to exemplary embodiments hereof.

In a further embodiment as shown in FIG. 3, mushroom compounds infused food grade oil, such as the infused food grade oil produced by process 102-110 (FIG. 2) described above, is used to infuse consumables with whole spectrum mushroom compounds.

First (at 202), at least a portion of the mushroom compounds infused food grade oil obtained from 102-110 (FIG. 2) is heated to a first temperature between about 170° F. and 240° F.

Next (at 204), a selection of consumables, is added and stirred into the mixture (preferably with continuous stirring) and held at the first temperature of about 170° F. to 240° F. for about 4-12 hours, with a preferred inner time range of 5-6 hours. For the purposes of this specification, the term "about" used in relation to periods of time will mean±3%.

Next (at 206), the mixture of the consumable and infused oil (or milk or water) is frozen into a solid, frozen biomass.

At this juncture, the solid, frozen biomass of infused food grade oil and consumable can be processed in one of several ways. First, the food grade oil and consumable can be heated, strained, and frozen or packaged as per steps 208, 210, and 212 (below) to yield a mushroom compounds infused consumable produced by a single round or phase of heating and freezing. Second, the food grade oil and consumable alternatively can be treated with a second cycle or phase of heating and freezing, in which steps 204 and 206 are repeated, followed by subsequent steps 208, 210, and 212 to yield a mushroom compounds infused consumable produced by two cycles of heating and freezing. Third, the second cycle treatment can be followed by a third cycle or phase of heating and freezing, in which steps 204 and 206 are repeated. Following a third cycle, the frozen biomass the frozen biomass can be heated and strained as per steps 208 and 210 to yield a mushroom compounds infused consumable produced by three cycles or phases of heating and freezing.

The single cycle/phase treatment typically will produce a mushroom compounds infused consumable having a lesser relative level of infused mushroom compounds compared to a double cycle/phase treatment that will typically yield a greater level of infused mushroom compounds. For some particular applications and desired infusion levels, a third cycle treatment may yield an even greater level of infused mushroom compounds than a single or double cycle treatment.

Following step 206, at step 208, the mixture including the now infused consumable and infused oil is heated to a temperature equal to or between 150° F. and 200° F. and held at the temperature for a sufficient period of time to liquefy the food grade oil, typically about 2-4 hours, and preferably for about 2 hours.

After this heating step at 208, the mixture is strained at step 210 (using any suitable straining techniques) and the mushroom compounds infused consumables are removed from the food grade oil.

Then (at 212), the mushroom compounds infused consumables are typically frozen and stored frozen for subsequent use/packaging/consumption. Alternatively, the mushroom compounds infused consumables can be directly used, packaged, or consumed without freezing.

This process 202-212 (FIG. 3) results in a food consumable infused with mushroom compounds, which can be referred to as a mushroom compounds infused consumable.

In some embodiments, the freezing step at 206 provides pressure to the consumable that deepens the physical depth of the mushroom compounds infusion into the consumables. For example, in some embodiments, the freezing step at 206 causes the mushroom compounds to be pressed 10%, 20%, 30%, 40%, 50%, 60%, 70%, 80%, 90% and upwards of 100% to the centers of the infused consumable.

It is understood that the acts described above are meant as a general overview and demonstration of an exemplary method, and that the method may include different and/or additional acts as described herein or otherwise.

While the present invention has been described as having particular configurations disclosed herein, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

It is understood that any aspect and/or element of any embodiment of the method(s) described herein or otherwise may be combined in any way to form additional embodiments of the method(s) all of which are within the scope of the method(s).

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments and is further described in the examples below, it is to be understood that the invention is not to be limited to the disclosed embodiment, but on the contrary, is intended to cover various modifications and equivalent arrangements included within the spirit and scope of the appended claims.

Example I: Coffee Beans

Mushroom compounds infused roasted coffee beans may be made by infusing roasted coffee beans with a mushroom compounds infused food grade oil obtained as described above and outlined in FIG. 2.

In a preferred embodiment, mushroom compounds infused roasted coffee beans may be made by infusing roasted coffee beans with a mushroom compounds infused food grade oil as described in the process 202-212 (FIG. 3). The heating steps described in the process 202-212 (FIG. 3) for infusing roasted coffee beans are typically carried out at a temperature between 175° F. and 185° F. Once the mushroom compounds infused roasted coffee beans are obtained, they can be stored frozen to help preserve freshness and slow/prevent deterioration of the mushroom compounds that reduces the efficacy of the compounds. The infused roasted coffee beans can be used to make mushroom compounds infused coffee beverage(s).

Example II: Cacao Beans

The process by which cacao beans are infused with mushroom compounds follows the process described above and outlined in FIGS. 2 and 3. Once the mushroom compounds infused cacao beans are obtained, they can be stored frozen to help preserve freshness and slow/prevent deterioration of the mushroom compounds that reduces the efficacy of the mushroom compounds.

The mushroom compounds infused cacao beans can be processed in any of a variety of methods similar to standard cacao beans (which are not infused) to produce mushroom compounds infused cacao and chocolate products, such as but not limited to, hot chocolate beverage, chocolate chips, chocolate bars, chocolate bars with nuts and fruit, chocolate bars with nougat, and so on. In a preferred embodiment, mushroom compounds infused chocolate bars with nuts and/or dehydrated fruits are made with chocolate from mushroom compounds infused cacao beans and mushroom compounds infused nuts and/or dehydrated fruits that are produced by the methods disclosed herein. Such chocolate bars made with mushroom compounds infused chocolate and nuts and/or dehydrated fruits have a greater level of mushroom compounds and therefore potency than chocolate bars made solely with mushroom compounds infused chocolate with nuts and/or fruits that are not infused.

Example III: Popcorn

Mushroom compounds infused popcorn kernels may be made by infusing popcorn kernels with a mushroom compounds infused food grade oil obtained as described above and outlined in FIG. 2.

To infuse popcorn kernels with mushroom compounds from a mushroom compounds infused food grade oil, raw kernels are added to infused food grade oil at a temperature between 150° F. and 200° F. (preferably 170° F.) in the process described above and in FIG. 3. The infused kernels can then be used directly for popcorn or can be treated using methods that impart various flavors and/or seasoning to the popcorn. Infused kernels that are to be used directly for popcorn are typically stored in a cooking oil, typically at about a 1:1 kernels to oil ratio. The infused kernels can then be popped directly from the stored mixture.

Example IV: Infused Dehydrated Fruit

The process by which dehydrated fruit is infused with mushroom compounds follows the process described above and outlined in FIGS. 2 and 3.

Virtually any dehydrated fruit can be used in the mushroom compounds infusion process, such as, but not limited to, dehydrated strawberries, other berries, cherries, apricots, mangos, grapes (raisins), cranberries, prunes, and so forth. Once the mushroom compounds infused dehydrated fruit is obtained, the fruit can be stored frozen to help preserve freshness and slow/prevent deterioration of the mushroom compounds that reduces the efficacy of the mushroom compounds. The mushroom compounds infused dehydrated fruit can be consumed directly or used in the preparation of various foods that contain dehydrated fruit, such as granola bars, chocolate bars, baked goods, trail mix, and the like. When used in the preparation of other foods, the mushroom compounds infused dehydrated fruit will provide a source of whole spectrum mushroom compounds to such foods.

Example V: Infused Raw Fruit

The process by which raw fruit is infused with mushroom compounds generally follows the process described above and outlined in FIGS. 2 and 3, with some modifications. In a preferred embodiment, MCT oil is used as the infused oil is used, given its relatively low melting/liquifying temperature.

To infuse raw fruit, the raw fruit is mixed with the mushroom compounds infused oil at a temperature between about 100° F. and 150° F. for 15 minutes to one hour. The mixture of infused oil and fruit is then frozen solid. Following the freezing, the mixture is liquified at a temperature between about 100° F. and 150° F. and then the fruit is separated from the oil using an acceptable straining method, such as straining through a nylon mesh filter. Preferably, the type of raw fruit used in this process has a relatively high density that helps keep the fruit intact throughout the process. For example, pineapple and mango are fruits that have been used in this process to produce mushroom compounds infused pineapple and mango. The infused fruits can be stored frozen to help preserve the integrity of the mushroom compounds. The fruits can be consumed directly or used in other foods, such as the aforementioned chocolate and granola bars.

Example VI: Raw and Roasted Nuts and Seeds

Mushroom compounds infused raw or roasted nuts and seeds may be made by infusing raw or roasted nuts and seeds with a mushroom compounds infused food grade oil obtained as described above and outlined in FIG. 2.

To infuse raw nuts and seeds or roasted nuts and seeds with mushroom compounds from a mushroom compounds infused oil, the consumables are added to infused oil at a temperature between 150° F. and 200° F. (preferably 170° F.) in the process described above and in FIG. 3. The infused nuts and seeds can then be consumed directly or used in other foods, such chocolate and granola bars, trail mix, and so forth.

Example VII: Granola Bars

Mushroom compounds infused granola bars can be made using suitable mushroom compounds infused food grade oil as infused using the infusion process described above and outlined in FIG. 2.

Once a suitable mushroom compounds infused oil is produced, the infused oil can be used as a base for granola bars. The bars can be made with a variety of mushroom compounds infused nuts and/or seeds that are formed into granola bars with oatmeal (that likewise can be infused with mushroom compounds) or a similar foodstuff that is commonly used in granola bars. Such granola bars formed in this manner can contain a significant number of mushroom compounds.

Example VIII: Infused Garlic and Beans

Mushroom compounds infused garlic and beans (such as pinto beans, navy beans, and other similar beans) can be made using a suitable mushroom compounds infused food grade oil infused with mushroom compounds using the infusion process described above and outlined in FIG. 2.

The process by which garlic or beans are infused with mushroom compounds closely follows the general process described above and outlined in FIG. 3. The heating steps described in the process 202-216 (FIG. 3) for infusing garlic and beans is typically carried out at a temperature between 150° F. and 170° F. for 3-4 hours. Once the mushroom compounds infused garlic or beans are obtained, the garlic or beans can be stored frozen to help preserve freshness and slow/prevent deterioration of the mushroom compounds that reduces the efficacy of the mushroom compounds.

Example IX: Infused Bacon

Mushroom compounds infused bacon can be made using a suitable mushroom compounds infused good grade oil made with the oil infusion process described above and outlined in FIG. 2.

Once a suitable mushroom compounds infused oil is produced, the infused oil can be used to infuse bacon with mushroom compounds. To infuse bacon, raw bacon is initially laid out on a baking pan or similar baking sheet that preferably has raised edges. The bacon is then coated with the mushroom compounds infused oil, along with a sufficient amount of infused oil to keep a layer of infused oil in the bottom of the baking pan to ensure that the bacon is exposed to the infused oil. The bacon with infused oil is then frozen solid. After freezing, the bacon with infused oil is heated to a temperature between 170° F. and 250° F. for 1-4 hours or until the bacon is crisp. The resulting mushroom compounds infused bacon is then strained from the mushroom compounds infused oil and resulting mushroom compounds infused bacon grease (such that there is a mushroom compounds infused oil and bacon grease mixture). The bacon is then stored for subsequent use, preferably either frozen or at a refrigerated/cool temperature.

The resulting mushroom compounds infused oil and bacon grease mixture is a bacon flavored mixture that can be used in the methods disclosed herein to infuse consumables with mushroom compounds and impart/add a bacon flavor to the consumable. For example, the mushroom compounds infused oil and bacon grease mixture can used to prepare popcorn as detailed above, resulting in a mushroom compounds infused, bacon flavored popcorn.

Example X: Infused, Flavored Oil

As detailed above, mushroom compounds infused food grade oils can be produced using essentially all food grade oils and butter, including but not limited to, coconut oil, butter, MCT oil, shortening, lard, vegetable oil, sunflower oil, olive oil, grape seed oil, avocado oil, and combinations thereof. Any of these oils and butter can be infused with mushroom compounds using the oil infusion process described above and outlined in FIG. 2. Mushroom compounds infused oils and butter can be used to infuse various consumables by the methods described above and outlined in FIG. 3 as well as the various specific examples described herein, such as those for infused raw fruit, bacon, garlic, and so on. The methods described herein may also be used to produce infused cooking flavoring agents, such as herbs and spices. Such mushroom compound infused, flavoring agents (herbs and spices) can be used on food to provide mushroom compounds and flavor.

Once a mushroom compounds consumable is produced by the methods described herein, the residual mushroom compounds infused food grade oil can typically be used in the process again since the residual infused oil still typically contains a significant amount of mushroom compounds. In this manner, residual infused oil typically can be used in the process once or twice, such that infused oil can overall be used 2-3/several times in the process.

Another aspect of the residual mushroom compounds oil is that the oil typically acquires/takes on flavor from the infused consumable. As indicated above, the process used to infuse bacon with mushroom compounds produces a residual mushroom compounds infused, bacon flavored oil and bacon grease mixture. The processes used to infuse other consumables likewise results in a flavored, mushroom compounds infused oil. For example, the residual oil from the process used to produce mushroom compounds infused garlic will have a garlic flavor; residual oil from mushroom compounds infused fruit will have a fruit flavor; residual oil from mushroom compounds infused with coffee will have a coffee flavor; and so on. The flavored, mushroom compound infused oils can be used to impart both flavors and mushroom compounds to other foods in several ways, such as, but not limited to, by directly using the infused oil on food, as a cooking oil, in the infusion methods disclosed herein, and so forth.

Example XI: Ice Cream, Jams, and Jellies with Infused Fruit

As detailed above, mushroom compounds infused fresh and dehydrated fruits can be produced by methods disclosed herein. Such mushroom compounds infused fruits can in turn be used in ice cream, jams, and jellies to produce mushroom compounds infused, flavored ice cream, jams, and jellies. For example, mushroom compounds infused fresh fruit can be used to make a slurry that in turn can be used in making ice cream, jams, or jellies, resulting in mushroom compounds infused and flavored ice cream, jams, or jellies. The mushroom compounds content of such products can be increased by adding other mushroom compounds infused consumables, such as mushroom compounds infused nuts and/or chocolate.

Example XII: Caramel Sauce Containing Infused Mushroom Compounds

As detailed above, mushroom compounds infused food grade oil can be produced by the methods disclosed herein. Such oil can in turn be added to caramel sauce to produce a mushroom compounds containing caramel sauce. A mushroom compounds containing caramel sauce can be used in the production of ice cream to add mushroom compounds into the ice cream. Alternatively, a mushroom compounds containing caramel sauce can be used as a topping, a flavoring agent/ingredient for other foods, and so forth. In this regard, mushroom compounds containing caramel sauce can be used to add both flavor and mushroom compounds to a variety of consumables.

Example XIII: Mushroom Compounds Infused Baked Goods

As detailed above, mushroom compounds infused food grade oil can be produced by the methods disclosed herein. Such infused oil can in turn be used to make various baked goods, such as cookies, brownies, quick breads, and so forth. In this regard, mushroom compounds infused oil can be added as a base ingredient for baked goods, such as the food grade oil in baked goods or in combination with other base ingredients, such as butter. In one exemplary embodiment, a ratio of 75% mushroom compounds infused oil to 25% mushroom compounds infused butter is used as a base ingredient in making cookies, brownies, and other baked goods.

Example XIV: Mushroom Compounds Infused Freeze Dried Consumables

As detailed above, mushroom compounds infused food grade oil can be produced by the methods disclosed herein. Such infused oil can in turn be used to make a wide variety of various mushroom compounds infused consumables, such as infused raw fruit, ice cream, and so forth. A wide variety of mushroom compounds infused consumables can in turn be treated by the process of lyophilization, commonly known as freeze-drying, to turn the mushroom compounds infused consumables into another form of consumable. Lyophilization typically removes 98% of the original water content, typically resulting in a crunchy and/or creamy consumable. Accordingly, the methods described herein can be applied to produce mushroom compounds infused consumables that in turn are freeze-dried to produce freeze-dried mushroom compounds infused consumables. The freeze-drying process allows foods such as infused fruit to retain both its mushroom compounds and its nutrition.

Example XV: Pressure Cooked Mushroom Compounds Infused Consumables

As detailed above, mushroom compounds infused food grade oil be produced by the methods disclosed herein. Such infused oil can in turn be used to make a wide variety of various mushroom compounds infused consumables by methods that include heating and freezing steps to infuse the consumables with mushroom compounds, as described above. In an exemplary embodiment, the heating steps may be carried out under pressure, such as in a pressure cooker. In this regard, the levels of infused mushroom compounds in an infused consumable produced with pressure cooking can be greater than the relative levels obtained without pressure cooking. Accordingly, pressure cooking, or similar pressurized heating can be used to produce consumables that potentially have even higher levels of infused mushroom compounds when compared to the infused consumables produced by the methods disclosed herein.

Example XVI: Mushroom Compounds Infused Oils in Personal Care Products

As detailed above, mushroom compounds infused oils can be produced by the methods disclosed herein. Such infused oils can in turn be used in formulations for a wide variety of various mushroom compounds infused non-consumable and personal care products. For example, many topicals, ointments, lotions, and hair care products and formulations may contain or be enhanced with various infused oils. Mushroom compounds infused oils used in personal care products and formulations can provide beneficial effects of mushroom compounds, including medicinal benefits of various mushrooms noted above. Skincare benefits of mushroom compounds may include, but are not limited to, neutralizing free radicals to promote healthier, more even skin tone; anti-inflammatory and antioxidant benefits; improved barrier function, soothing inflammation, and anti-wrinkle benefits; fading dark spots and scars, evening skin tone, brightening the skin; increased hydration and skin-plumping effects; and increased blood flow. Likewise, mushroom compounds in hair care products, such as shampoo, conditioners, mousse, balm, pomades and so forth can help promote healthy hair and growth, given that mushrooms are a source of vitamins, antioxidants, and minerals, which are useful in both promoting healthy, strong hair, preventing hair loss and other problems, and aiding in hair growth.

What is claimed is:

1. A method of infusing a food grade oil with whole spectrum mushroom compounds, the method comprising:

(A) providing mushroom material, wherein the mushroom material comprises a psylocibin mushroom;

(B) providing a food grade oil at a temperature of 180° F.-240°;

(C) adding at least a portion of the mushroom material of (A) to the oil of (B) to form a mushroom material and food grade oil mixture;

(D) heating the mushroom material and food grade oil mixture of (C) to a temperature of 180° F.-240° F. for 4-9 hours;

(E) freezing the mushroom material and food grade oil mixture of (D) into a solid, frozen biomass comprising the frozen psylocibin mushroom and the frozen food grade oil;

(F) heating the solid, frozen biomass of mushroom material and food grade oil mixture of (E) at a temperature of 150° F.-200° F. for 2-4 hours, wherein heating the frozen biomass of mushroom material and food grade oil mixture of (E) releases an active ingredient, psilocybin, from the biomass of mushroom material into the food grade oil; and (G) straining the mushroom material and food grade oil mixture of (F) to separate the food grade oil from the mushroom material to yield a whole spectrum mushroom compounds infused food grade oil, wherein the whole spectrum compounds comprise psilocybin.

2. The method of claim 1, further comprising: repeating steps (D) and (E) one or more times before step (F).

3. The method of claim 1, wherein the food grade oil provided in (B) is selected from the group consisting of coconut oil, medium chain triglycerides oil, vegetable oil, sunflower oil, olive oil, grape seed oil, avocado oil, butter, shortening, margarine, lard, and a combination thereof.

4. The method of claim 1, wherein the food grade oil provided in (B) is medium chain triglycerides oil or a mixture of coconut oil and medium chain triglycerides oil.

5. The method of claim 1, wherein the mushroom material in (A) is obtained from mushrooms selected from the group consisting of chanterelle, truffle, morel, trumpet, oyster, shiitake, maitake, cremini, lobster, porcini, hedgehog, portobello, white, button, eenoki, cordyceps, lion's mane, reishi, argarikon, cordyceps, chaga, maitake, turkey tail, shiitake, psilocybin, and combinations thereof.

6. The method of claim 1, wherein the mushroom material in (A) is obtained from a lion's mane mushroom.

7. A method of infusing an orally ingestible consumable with whole spectrum mushroom compounds, the method comprising:

(A) providing mushroom material, wherein the mushroom material comprises a psylocibin mushroom;

(B) providing a food grade oil at a temperature of 180° F.-240° F.;

(C) adding at least a portion of the mushroom material of (A) to the oil of (B) to form a mushroom material and food grade oil mixture;

(D) heating the mushroom material and food grade oil mixture of (C) to a temperature of 180° F.-240° F. for 4-9 hours;

(E) freezing the mushroom material and food grade oil mixture of (D) into a solid, frozen biomass comprising the frozen psylocibin mushroom and the frozen food grade oil;

(F) heating the solid, frozen biomass of mushroom material and food grade oil mixture of (E) at a temperature of 150° F.-240° F. for 2-4 hours, wherein heating the frozen biomass of mushroom material and food grade oil mixture of (E) releases an active ingredient, psilocybin, from the biomass of mushroom material into the food grade oil;

(G) straining the mushroom material and food grade oil mixture of (F) to separate the food grade oil from the mushroom material to yield a whole spectrum mushroom compounds infused food grade oil, wherein the whole spectrum mushroom compounds comprise psilocybin;

(H) adding at least one orally ingestible consumable to the whole spectrum mushroom compounds infused food grade oil of (G) to form a consumable and infused oil mixture;

(I) heating the consumable and infused oil mixture of (H) to a temperature of 170° F.-240° F. for 4-9 hours;

(J) freezing the consumable and infused oil mixture of (I) to form a solid, frozen mixture of consumable and infused oil;

(K) heating the solid, frozen mixture of consumable and infused oil of (J) to a temperature of 150° F.-200° F. for 2-4 hours to liquify the infused oil; and (L) straining the consumable from the infused oil of (K) to yield a consumable infused with whole spectrum mushroom compounds, comprising psilocybin.

8. The method of claim 7, further comprising: (M) freezing the infused consumable of (L).

9. The method of claim 7, further comprising: repeating steps (D) and (E) one or more times before step (F).

10. The method of claim 7, further comprising: repeating steps (I) and (J) one or more times before step (K).

11. The method of claim 7, further comprising:

repeating steps (D) and (E) one or more times before step (F); and repeating steps (I) and (J) one or more times before step (K).

12. The method of claim 7, wherein the food grade oil provided in (B) is selected from the group consisting of coconut oil, medium chain triglycerides oil, vegetable oil, sunflower oil, olive oil, grape seed oil, avocado oil, butter, shortening, margarine, lard, and a combination thereof.

13. The method of claim 7, wherein the food grade oil provided in (B) is medium chain triglycerides oil or a mixture of coconut oil and medium chain triglycerides oil.

14. The method of claim 7, wherein the mushroom material in (A) is obtained from mushrooms selected from the group consisting of chanterelle, truffle, morel, trumpet, oyster, shiitake, maitake, cremini, lobster, porcini, hedgehog, portobello, white, button, eenoki, cordyceps, lion's mane, reishi, argarikon, cordyceps, chaga, maitake, turkey tail, shiitake, psilocybin, and combinations thereof.

15. The method of claim 7, wherein the mushroom material in (A) is obtained from a lion's mane mushroom.

16. The method of claim 7, wherein the consumable is selected from the group consisting of coffee beans, cacao beans, popcorn kernels, raw nuts, raw seeds, roasted nuts, roasted seeds, and dehydrated fruit.

17. The method of claim 7, wherein the consumable comprises coffee beans and the food grade oil is coconut oil; and wherein step (H) further comprises adding the coffee beans to the whole spectrum mushroom compounds infused oil to form a coffee beans and infused coconut oil mixture;

wherein step (I) further comprises heating the coffee beans and infused coconut oil mixture to a temperature of 175° F.-185° F. for 4-9 hours;

wherein step (J) freezing the coffee beans and infused coconut oil mixture to: form a solid, frozen mixture of coffee beans and infused coconut oil and increase a pressure on the coffee beans, causing the whole spectrum mushroom compounds to penetrate the coffee beans;

wherein step (K) further comprises heating the solid, frozen mixture of the coffee beans and infused coconut oil to a temperature of 175° F.-185° F. for 2-4 hours to liquify the infused coconut oil; and wherein step (L) further comprises straining the coffee beans from the infused coconut oil to yield coffee beans infused with the whole spectrum mushroom compounds.

18. The method of claim 7 wherein the consumable comprises cacao beans and the whole spectrum mushroom compounds infused food grade oil comprises infused coconut oil; and wherein step (H) further comprises adding cacao beans to the infused coconut oil to form a cacao beans and infused coconut oil mixture;

wherein step (I) further comprises heating the cacao beans and infused coconut oil mixture of to a temperature of 175° F.-185° F. for 4-9 hours;

wherein step (J) further comprises freezing the cacao beans and infused coconut oil mixture of to: form a solid, frozen mixture of cacao beans and infused coconut oil and increase a pressure on the cacao beans, causing the whole spectrum mushroom compounds to penetrate the cacao beans;

wherein step (K) further comprises heating the solid, frozen mixture of the cacao beans and infused coconut oil to a temperature of 175° F.-185° F. for 2-4 hours to liquify the infused coconut oil; and wherein step (L) further comprises straining the cacao beans from the infused coconut oil to yield cacao beans infused with the whole spectrum mushroom compounds.

19. The method of claim 7, wherein the consumable comprises popcorn kernels and the food grade oil comprises coconut oil; and the method further comprises:

wherein step (H) further comprises adding the popcorn kernels to the whole spectrum mushroom compounds infused food grade oil of (G) to form a popcorn kernels and infused coconut oil mixture;

wherein step (I) further comprises heating the popcorn kernels and infused coconut oil mixture of (H) to a temperature of about 170° F. for 4-9 hours;

wherein step (J) further comprises freezing the popcorn kernels and infused coconut oil mixture of (I) to: form a solid, frozen mixture of popcorn kernels and infused coconut oil and increase a pressure on the popcorn kernels, causing the whole spectrum mushroom compounds to penetrate the popcorn kernels;

wherein step (K) further comprises heating the solid, frozen mixture of the popcorn kernels and infused coconut oil of (J) to a temperature of 175° F.-185° F. for 2-4 hours to liquify the infused coconut oil; and wherein step (L) further comprises straining the popcorn kernels from the infused coconut oil of (K) to yield popcorn kernels infused with the whole spectrum mushroom compounds.

20. The method of claim 1, wherein the whole spectrum mushroom compounds additionally comprise one or both of:

(1) one or more of psilocin, norpsilocin, baeocystin, norbaeocystin, and aeruginascin; and (2) at least an adaptogenic compound from one or more of cordyceps, Lion's Mane, and Reishi mushroom.

* * * * *